M. JOHNSON.
APPARATUS FOR REDUCING FRICTION BETWEEN WATER AND THE HULLS OF SHIPS.
APPLICATION FILED OCT. 12, 1912.
1,066,732. Patented July 8, 1913.
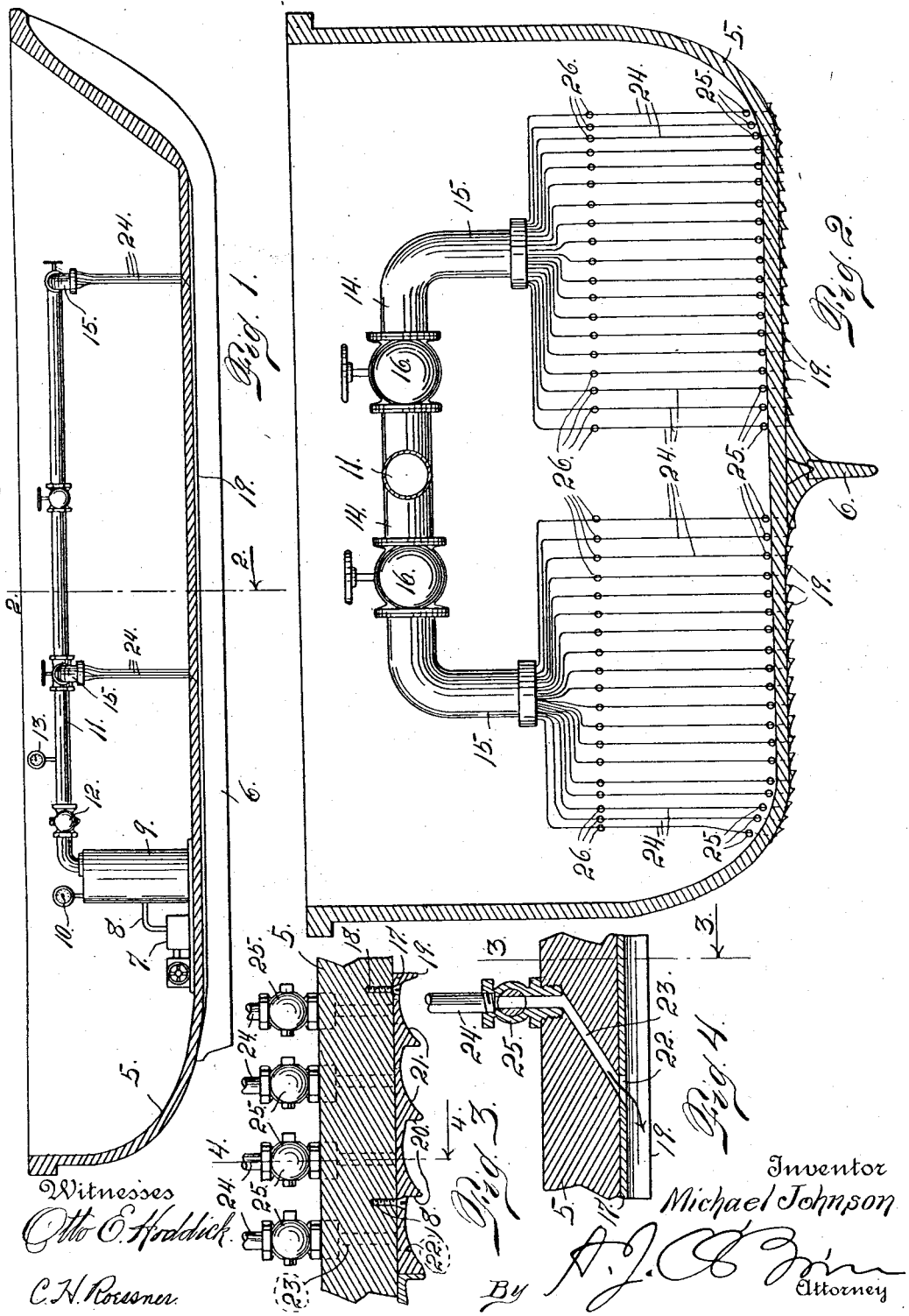

UNITED STATES PATENT OFFICE.

MICHAEL JOHNSON, OF CRIPPLE CREEK, COLORADO.

APPARATUS FOR REDUCING FRICTION BETWEEN WATER AND THE HULLS OF SHIPS.

1,066,732. Specification of Letters Patent. Patented July 8, 1913.

Application filed October 12, 1912. Serial No. 725,506.

*To all whom it may concern:*

Be it known that I, MICHAEL JOHNSON, a citizen of the United States, residing at Cripple Creek, county of Teller, and State of Colorado, have invented certain new and useful Improvements in Apparatus for Reducing Friction Between Water and the Hulls of Ships; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to a means for reducing friction between the water and the hull of a ship.

The invention consists in the passing of air through openings in the hull of a ship to the outer or lower surface of the hull, and at frequent intervals, crosswise of the ship, whereby a thin film of air is provided between the hull and the water.

The purpose of the invention is to gradually reduce the friction present in the ordinary construction between the hull of the ship and the water, and consequently reduce the power necessary for the propulsion of the ship and increase the speed proportionately.

One embodiment of my invention is disclosed in the accompanying drawing forming a part of this specification, in which:

Figure 1 is a longitudinal section of a ship including my improvement. Fig. 2 is a cross section upon the line 2—2, Fig. 1, looking in the direction of the arrow, the figure being upon a larger scale than Fig. 1. Fig. 3 is a view upon a larger scale of a portion of the right side of the hull as shown in Fig. 2, with correlated parts. This figure is also a section on line 3—3, Fig. 4, looking in the direction of the arrow. Fig. 4 is a section taken upon the line 4—4, Fig. 3, looking in the direction of the arrow.

The same reference characters indicate the same parts in all the views.

Let the numeral 5 indicate the hull of a ship and 6 the keel thereof. At any convenient position in the vessel I locate an air-compressor 7, which may be connected to the power source of the ship, or to a motor supplied from a storage battery, or which may be operated in any other convenient manner. The air compressed is passed through a pipe 8 into an air tank 9 upon which is mounted a gage 10. A conduit 11 communicates at one end with the air tank 9. Within this conduit 11 and near the air tank 9 is located a pressure reducer 12. A second gage 13 is connected with the pipe beyond this pressure reducer for convenience in adjusting the pressure reducer, and in order to determine whether or not the latter is working properly. At one or more points longitudinally of the vessel, transverse pipes 14 lead from the main conduit 11, these pipes 14 having downwardly extending portions 15. Valves 16 are conveniently located in the pipes 14 in order to permit the disconnection of any one of the latter from the main conduit 11.

Along the bottom of the hull of the ship I attach plates 17 by means of screws 18, or other suitable fastenings. These plates are provided on their under surfaces with ribs 19, each one of which has an abrupt wall 20 on the side nearest the keel of the ship, and a gradually sloping wall 21 upon the side farthest from the keel of the ship. By arranging the walls of the ribs as just described, greater resistance is offered to the passage of air over the edges of the ribs toward the sides of the ship, than to the passage of air over these ribs toward the keel of the ship. This special form of rib is unnecessary in perfectly calm water, but is of considerable advantage where there is any rocking of the boat, such as in a heavy sea.

The plates 17 are provided with slots 22 having their longest dimension extending lengthwise of the boat, the forward end of the slot being vertical and the rear end sloped in such a way as to offer the least resistance to the water. There is one of these slots 22 between each pair of ribs 19 across the entire vessel, and usually the slots will be arranged near the bow. There may, however, be more than one series of slots, as will appear hereafter. Leading upwardly from each slot 22, preferably at an angle toward the bow of the ship, (see Fig. 4), is a perforation 23 in the hull, each of the perforations being connected by a pipe 24 with the downwardly extending portion 15 of a large transverse pipe 14. I may locate valves in these pipes 24 at convenient points, in order that portions may be disconnected from both the air-supply system and from the water, which will sometimes become necessary for purposes of repair or the like. In the drawing I have illustrated one series of such valves 25 just above the hull, and another series of valves 26 in positions near the juncture of the pipes 24 with the depending portions 15 of the transverse pipes 14.

In calm weather it will be necessary to introduce air into the grooves between the ribs 19 only near the bow of the boat, as the air will remain in these grooves until the ship has passed over, but when rough weather is encountered and the ship rolls considerably in consequence, air supplied to the grooves near the bow is likely to be lost before reaching the stern of the boat, due to its passing over the edges of the ribs and up the sides of the vessel. It is, therefore, deemed advisable to provide one or more additional series of connections from the main conduit 11 to the grooves in the plates 17 more or less in the rear of the connections near the bow. In Fig. 1 of the drawing I have shown two such sets of connections.

From the above description, it is believed that my method for reducing friction upon the hulls of ships, and the apparatus illustrated for accomplishing the purpose, will be readily understood. It may be stated, however, that I do not regard it as necessary to provide a very high pressure in the air-supply system, since the forward motion of the vessel will tend to form a suction at the bottom of each of the passages 23 through the hull. The reason for this may be explained by reference to Fig. 4, in which the parts are shown upon a scale of substantially the size I contemplate using in actual practice. In this figure the forward end of the ship is toward the right. It will be seen that its movement will create a more or less complete vacuum in the forward portion of the slot 22, the extent of this vacuum depending upon the speed of the vessel.

I claim:

In combination, the hull of a ship, plates mounted upon the lower surface of the hull and having ribs extending longitudinally of the ship, said plates having elongated longitudinally arranged openings extending therethrough between the ribs, the forward walls of said openings being abrupt and the rear walls sloping gradually downwardly and rearwardly said hull having passages therethrough communicating with the openings through the plates, and means for connecting the said passages with air above the water line of the ship.

In testimony whereof I affix my signature in presence of two witnesses.

MICHAEL JOHNSON.

Witnesses:
   A. J. O'BRIEN,
   MAY CLEMENTS.